Figure 1:
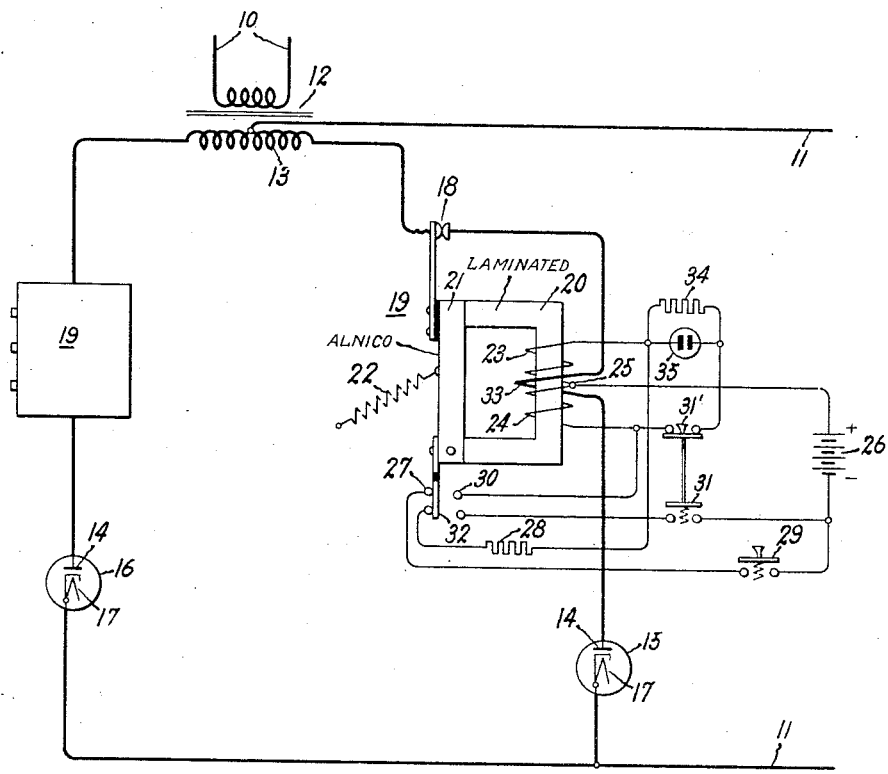

Feb. 29, 1944.  E. E. MOYER  2,343,199

PROTECTIVE SYSTEM

Filed Feb. 24, 1941

Inventor:
Elmo E. Moyer,
by Harry E. Dunham
His Attorney.

Patented Feb. 29, 1944

2,343,199

UNITED STATES PATENT OFFICE 2,343,199

PROTECTIVE SYSTEM

Elmo E. Moyer, Scotia, N. Y., assignor to General Electric Company, a corporation of New York Application February 24, 1941, Serial No. 380,178

8 Claims. (Cl. 175—294)

My invention relates to electric protective systems and particularly to systems of this character for protecting electrical apparatus from reverse currents. The present invention is well adapted for use in connection with unilaterally conductive devices such as electric discharge valves.

In protective systems employing circuit interrupters having a current coil for effecting operation of the interrupter in response to reverse current, there is a possibility that if the reverse current reaches a large value in a short interval of time the flux due to the reverse current will increase sufficiently in the reverse direction to seal the magnetic structure of the interrupter before the contacts have had time to move to open position and interrupt the circuit. In accordance with the teachings of my invention I provide means for limiting the build-up of flux in the reverse direction due to reverse current so that the electro-magnetically operated circuit interrupter will not seal-in due to flux in the reverse direction even though the reverse current is of a large magnitude. This feature is of particular importance in connection with the protection of electric discharge valves from reverse currents due to arc-backs.

It is an object of my invention to provide an improved protective system.

It is a further object of my invention to provide an improved reverse current protective system.

It is another object of my invention to provide an improved reverse current protective system in which reliable operation is assured when a reverse current of large magnitude occurs.

It is a still further object of my invention to provide a new and improved protective system particularly adapted for the protection of electric valve converting systems in which the condition of substantially zero operating flux in the magnetic structure of the circuit interrupter is maintained regardless of the magnitude of the reverse current.

In accordance with the illustrated embodiments, I have shown my invention applied to a reverse current protective system for an electric valve rectifier. The contacts of a circuit interrupter are connected in the anode lead of each of the electric valves of the rectifier circuit. The circuit interrupter is of the type comprising an operating mechanism including a magnetic circuit having a movable armature. In the particular arrangement disclosed the magnetic circuit includes a permanent magnet for producing a holding flux to hold the armature in closed position but which does not produce sufficient flux to move the armature to closed position when the interrupter is open. Wound on the magnetic core structure is a current coil and a pair of potential coil sections which are energized from a direct current source through manually operable push-buttons to aid or oppose the flux produced by the permanent magnet to close and trip the interrupter respectively. The current coil is wound in a direction to aid the permanent magnet flux when the current is in the forward direction and to oppose this flux when a reverse current occurs. Means associated with the potential coil sections are provided to prevent the flux in the magnetic circuit of the interrupter from reversing in direction due to a large reverse current and in this way eliminate the possibility that the armature will be held in the closed position due to flux in the reverse direction before the armature has moved away from the remainder of the magnetic circuit.

Figure 2:
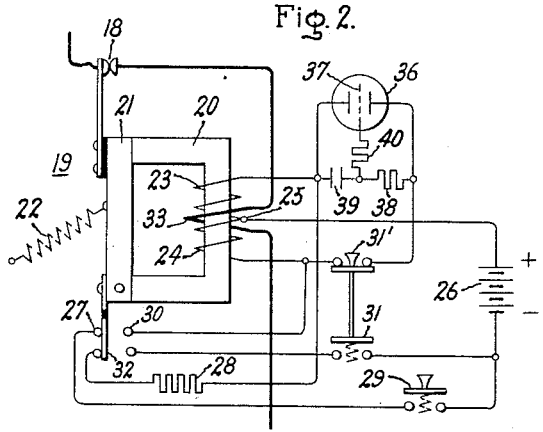

My invention will be better understood by reference to the following description taken in connection with the accompanying drawing and its scope will be pointed out in the appended claims. In the drawing, Fig. 1 is a schematic representation of one embodiment of my invention applied to an electric valve rectifier system, and Fig. 2 is a modification of a portion of the system of Fig. 1.

Referring now to the drawing, I have shown my invention embodied in a protective system for an electric valve rectifier for transmitting energy from an alternating current circuit 10 to a direct current circuit 11 and including a supply transformer 12 having a secondary winding 13 the midpoint of which is connected to one of the direct current lines 11. The end terminals of the secondary winding 13 are connected respectively to the anodes 14 of electric discharge valves 15 and 16. The electric discharge valves may be of any type well known in the art, and preferably each comprises an envelope containing a gas or vapor and including in addition to the anode 14, a cathode 17. The cathodes 17 of the electric valves 15 are connected together and to the other side of the direct current circuit 11. Inasmuch as the present invention is equally applicable to rectifiers of the controlled and uncontrolled type, control electrodes and circuits for energizing the same have been omitted to simplify the drawing.

Connected in circuit with the anode of the discharge valves 15 and 16 are the contacts 18 of a circuit interrupting device illustrated generally by the numeral 19. Since both of the devices 19 are identical, only one has been shown in detail and only one will be described. The interrupter includes a magnetic circuit comprising a laminated core member 20 of substantially U-shape which is closed in the closed circuit position of the contacts 18 by a movable armature 21. A permanent magnet pole face may be provided on the core 20 or, as illustrated, the member 21 may be formed wholly or partially of permanent magnet material preferably of the type having a high coercive force, such as Alnico. The armature 21 is biased to open position by a spring 22. The strength of the permanent magnet is selected with respect to the spring 22 so that the contacts 18 are held in closed position when they are once closed, but the flux produced thereby when the armature is in open circuit position is not sufficient to cause the closure thereof. Wound on the magnetic core member 20 are potential coil sections 23 and 24 having a common terminal 25 connected to one terminal of a source of direct current voltage such as the battery 26. The end terminals of the sections 23 and 24 are connected to the other terminal of battery 26 through trip and close circuits, respectively. The trip circuit includes fixed contacts 27, current limiting resistor 28 and manually operable tripping switch 29. Similarly, the end terminal of coil section 24 is connected to the other terminal of battery 26 to fixed contacts 30 and manually operable closing switch 31. The fixed contacts 27 of the tripping circuit are bridged by a contact member 32 in the closed circuit position of the circuit interrupter 19. As illustrated in the drawing, the member 32 is supported in insulated relation with respect to the armature 21. A reverse current operating coil 33 connected in series with the anode lead of the electric valve 15 is wound on the core member 20 in a direction to produce a flux which aids the permanent magnet flux in holding the armature 21 in closed position when the current is flowing through the valve 15 in the normal direction.

In order to prevent a build-up of flux in the magnetic circuit, including core 20 and armature 21, in a reverse direction in response to a reverse current of large magnitude and in this way seal-in the interrupter before the contacts 18 have had an opportunity to separate, I provide means associated with the coil sections 23 and 24 for limiting the flux produced in the core 20 by the reverse current coil 34 to such a value that the net flux, due to the permanent magnet and the reverse current, is substantially zero. In the arrangement shown in Fig. 1 this means comprises a resistor 34 and a glow discharge device 35 of the type requiring a predetermined voltage for producing ionization. Resistor 34 and glow discharge device 35 are connected in parallel and across the end terminals of the potential winding sections 23 and 24. Upon the occurrence of a reverse current in the coil 33, due for example to a failure of the electric valve 15, a voltage will be induced in the winding sections 23 and 24 having a value dependent upon the rate of change of current in the current coil 33 and the impedance of the circuit including resistor 34 and device 35. For a given installation it is possible to design the reverse current coil and the coil sections 23 and 24 and to select the constants of the resistor 34 and the glow discharge device 35 so that the discharge device will break down at substantially the time that the flux due to the reverse current is equal to the permanent magnet flux. There will then be a low resistance path across the terminals of the coil sections 23 and 24 and an increase in the flux due to reverse current will be prevented. In this way the period of substantially zero flux will be maintained independently of the magnitude of the reverse current and the armature 21 will not have a tendency to seal-in and prevent opening of the anode circuit by the contacts 18. It may be desirable in some cases to provide switch 31' operable to open circuit position when switch 31 is closed to remove the discharge device from the circuit and prevent it from limiting the pick-up flux produced by coil section 24. From what has just been said concerning the operation of the arrangement of Fig. 1, it is apparent that this circuit is responsive to the rate of change of reverse current rather than to an integrated quantity which will indicate when the flux due to the reverse current is equal to the permanent magnet flux. Before describing the operation of Fig. 1 in detail, let us consider the modification shown in Fig. 2 in which means are provided for rendering the response dependent upon the total change in current through the current coil so that the circuit will respond more accurately to limit the flux due to reverse current at the proper time. The modification shown in Fig. 2 is generally similar to Fig. 1 and like numbers have been used to designate the same parts. In connection with Fig. 1, it was pointed out that the resistor 34 and glow discharge device 35 respond to the rate of change of flux in the magnetic circuit of the breaker and for this reason do not give an accurate indication of the time at which the net flux in the core is zero, under varying operating conditions. In the modification shown in Fig. 2 means are provided for integrating the change of flux so that an indication of the total flux change may be obtained and in this way the opposing flux may be limited more accurately to a value which produces zero net flux in the core structure.

Referring now to Fig. 2, the coil sections 23 and 24 are shunted by a circuit including in one branch a grid controlled glow discharge device 36 having a control grid 37, and a second branch including a resistor 38 and a capacitor 39 connected in series. The common terminal of the resistor 38 and capacitor 39 is connected to the control grid of the glow discharge device through a current limiting resistor 40. The remainder of the circuit is the same as that described in connection with Fig. 1 and the parts thereof have been designated by the same numerals. Since the voltage across the capacitor 39 is a function not only of the voltage induced in the coil sections 23 and 24 but also of time, it is apparent that this arrangement will be responsive not to the rate of change of flux in the magnetic core structure alone but to an integrated quantity of rate of flux change and time. As a result the time of breakdown of the glow discharge device 36 more effectively maintains the net flux in the magnetic structure at zero value.

A brief description of the operation of the illustrated embodiments of my invention will be given although it is believed that in view of the foregoing detailed description it will be apparent to those skilled in the art. When operating as a rectifier, the electric discharge valves 15 and 16 are effective to convert alternating current from the circuit 10 to direct current supplying the circuit 11. The permanent magnet strength of the circuit interrupter is such that the flux due to the permanent magnet alone is sufficient to hold the armature in closed position but will not pick the armature from open position. The coil sections 23 and 24 are connected with the battery 26 and are wound in such direction that the flux produced by the coil section 23, which is in the tripping circuit, is just sufficient to overcome the flux due to the permanent magnet and trip the interrupter, while the section 24 which is connected in circuit with the battery 26 and the closing switch 31 produces a flux which assists the permanent magnet flux. The flux due to the current coil 33 is in a direction to aid the holding flux produced by the permanent magnet when the current is in the normal direction. Since the rate of change of flux due to the direct current pulses of current in the anode circuit may be fairly large, the voltage induced in the coil winding sections 23 and 24 may be sufficient to cause the glow discharge devices 35 or 36 to glow when the valve associated therewith is conductive and in this way provide an indicator of normal operation of the electric valve. If there is reverse current due to arc-back or other failure of the circuit, the flux due to the current coil 33 opposes the holding flux and when it becomes equal thereto the net flux in the core is zero and the structure is easily opened under the influence of the biasing spring 22. In order to prevent sealing-in of the armature 21 due to a build-up of flux in the reverse direction due to a reverse current the net flux is maintained at a substantially zero value by means of the resistor 34 and glow discharge device 35 which operate in response to the voltage induced in the coil winding sections 23 and 24 or in other words to the rate of change in flux in the magnetic circuit of the interrupter. The resistor 34 across the coil sections 23 and 24 prevents the voltage of the coil sections from reaching the breakdown value of the discharge device 35 instantaneously. As previously stated, this arrangement is an approximation since it responds to the rate of change of flux rather than to the total change of flux. The arrangement shown in Fig. 2, however, approximates this desired operating condition more closely and in this arrangement the condenser 38 is charged in response to the voltage induced in the coil sections 23 and 24 due to the change of flux in the core structure 20. Since the voltage on the condenser 38 is responsive not only to the magnitude of the voltage induced in the coil sections 23 and 24 but also to time, it is apparent that in this arrangement the total voltage on the condenser is a measure of the flux change in the core structure of the interrupter. Explained in another way, the capacitor voltage lags the coil voltage approximately 90 degrees and is therefore more nearly in phase with the coil flux which it is intended to measure. The voltage of the condenser is utilized to determine the breakdown of the discharge device 36 and in the particular arrangement is utilized to control the voltage of the control grid 37.

While I have shown and described particular embodiments of my invention, it will be obvious to those skilled in the art that changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. A reverse current protective system comprising a circuit interrupter having a magnetic circuit, means for producing a unidirectional flux in said circuit for maintaining said circuit interrupter in closed position, a control winding associated therewith having a plurality of sections, means for selectively energizing said sections to produce flux in opposite directions in said core for tripping and closing said interrupter, a current coil associated with said core for producing a unidirectional flux in opposition to said unidirectional flux in response to a reverse current therethrough, and means associated with said core for limiting the change in flux in said core structure due to a reversal of current in said current coil to prevent the flux due to said reverse current from holding said circuit interrupter in closed position.

2. A protective system for an electric circuit comprising in combination a circuit interrupter including a magnetic circuit having a movable armature associated therewith, means for producing a holding flux in said magnetic circuit to hold said armature in closed position, means for producing a flux in opposition to said holding flux in response to a reversal of current in the circuit controlled by said interrupter, and means responsive to the change of flux in said magnetic circuit due to a reversal of current for limiting the magnitude of said last mentioned flux to prevent said armature from being held in closed position thereby.

3. A protective system for an electric circuit comprising in combination a circuit interrupter including a magnetic circuit having a movable armature associated therewith, means for producing a holding flux in said magnetic circuit to hold said armature in closed position, means for producing a flux in opposition to said holding flux in response to a reversal of current in the circuit controlled by said interrupter, and means comprising a glow discharge device and means including resistance means connected in parallel and associated with said magnetic circuit to be responsive to the rate of change of flux in said magnetic circuit for limiting the magnitude of said second named flux to prevent said armature from being held in closed position thereby.

4. A protective system for an electric circuit comprising in combination a circuit interrupter including a magnetic circuit having a movable armature associated therewith, means for producing a holding flux in said magnetic circuit to hold said armature in closed position, means for producing a flux in opposition to said holding flux in response to a reversal of current in the circuit controlled by said interrupter, a winding associated with said magnetic circuit and having a serially connected resistance means and capacitor connected across the terminals thereof, electric valve means paralleling said resistance means and capacitor and having a control member energized in accordance with the voltage of said capacitor.

5. A protective system comprising in combination, an electric circuit, a circuit interrupter connected to protect said circuit and including a magnetic circuit having a movable armature associated therewith, means for producing a holding flux to hold said armature in closed position, a winding associated with said magnetic circuit for producing a flux having a magnitude dependent upon the current in said electric circuit and wound in a direction to produce a flux in opposition to said holding flux in response to a reversal of current in said electric circuit, means electro-magnetically associated with said magnetic circuit for limiting the flux produced by said reverse current to prevent said armature from being held in closed position by said last mentioned flux.

6. A protective system comprising in combination, an electric circuit, an interrupter having the contacts thereof connected in said circuit and including a magnetic circuit having a movable armature associated therewith normally biased to open position, means for producing a holding flux to hold said armature in closed position, winding means associated with said core, means for energizing said winding means to produce a flux in one direction to overcome said holding flux and allow said armature to move to open position, means for energizing said winding means to produce a flux in the opposite direction to move said armature to closed position, a winding associated with said magnetic circuit and energized in response to current of said electric circuit, said last mentioned winding being wound in a direction to produce a flux in opposition to said holding flux when the current in said electric circuit reverses, and means associated with said first mentioned winding means for limiting the magnitude of the flux produced by a reversal of current to prevent said armature from being held in closed position when said reverse current reaches a large value.

7. A protective system comprising in combination a circuit interrupter including a magnetic circuit having a movable armature associated therewith, permanent magnet means associated with said circuit for producing a flux to hold said armature in closed position, means for biasing said armature to open position, said holding flux having a magnitude sufficient to hold said armature in closed position against the action of said biasing means but insufficient to move said armature from open position to closed position, winding means associated with said magnetic circuit, means for energizing said winding means to produce a flux in opposition to said holding flux to open said circuit interrupter, means for energizing said winding means in a direction to aid said holding flux to move said armature to closed position, a winding associated with said magnetic circuit for producing a flux responsive to the current in said electric circuit and in a direction to oppose said holding flux when the current in said electric circuit reverses, and means responsive to the product of voltage induced in said first mentioned winding means and time for limiting the flux produced in said magnetic circuit by said last mentioned winding.

8. A protective system for an electric circuit comprising in combination a circuit interrupter including contacts in said circuit and comprising a magnetic circuit having a movable armature controlling the movement of one of said contacts, means for producing a holding flux in said magnetic circuit to hold said armature in closed position, a coil associated with said core and conducting a current dependent upon the current of said electric circuit and producing a flux in said core opposing the action of said holding flux when the current in said circuit reverses from the normal direction, and means responsive to the product of the rate of change of flux and time for limiting the flux produced in said core structure by reverse current in said coil to prevent said armature from being maintained in closed position by rapid reversal of current in said circuit.

ELMO E. MOYER.